E. J. COPELAND.
TANK GAGE.
APPLICATION FILED NOV. 16, 1914.
1,174,232.
Patented Mar. 7, 1916.
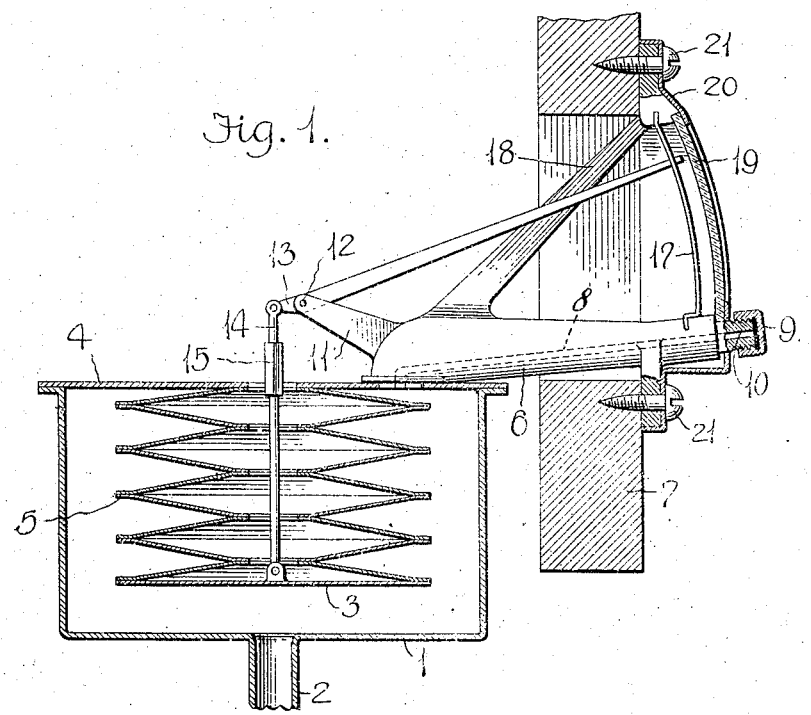
Fig. 1.
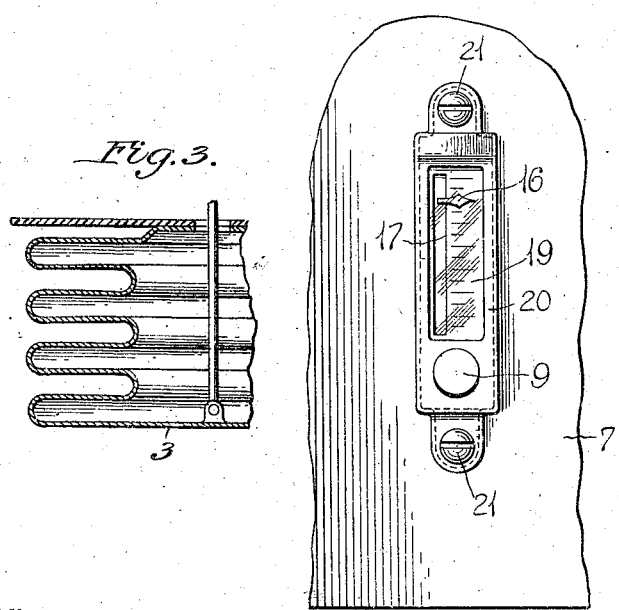
Fig. 3.
Fig. 2.
Witnesses
Chas W. Stauffiger
Anna M. Dorr
Inventor
Edmund J. Copeland.
By Bartlett & Bartlett
Attorneys

UNITED STATES PATENT OFFICE.

EDMUND J. COPELAND, OF DETROIT, MICHIGAN.

TANK-GAGE.

1,174,232. Specification of Letters Patent. Patented Mar. 7, 1916.

Application filed November 16, 1914. Serial No. 872,283.

*To all whom it may concern:*

Be it known that I, EDMUND J. COPELAND, a citizen of the United States of America, residing at Detroit, in the county of Wayne and State of Michigan, have invented certain and useful Improvements in Tank-Gages, of which the following is a specification, reference being had therein to the accompanying drawings.

This invention relates to tank gages and to an arrangement thereof whereby fluctuations in the level of the tank to which the gage may be applied, produce corresponding movements in an indicator through the medium of a transmitting fluid which operates with or against atmospheric pressure in expanding or contracting a suitably disposed and arranged chamber in the gage proper.

The invention also includes means for securing the gage in an accessible position whereby it can be readily filled, adjusted or otherwise manipulated without disconnecting it or disturbing its operative connections.

The device is particularly adaptable for use on the fuel tanks of automobiles, motor boats, or the like.

The invention consists in the matters hereinafter set forth, and more particularly pointed out in the appended claims.

In the drawings, Figure 1 is a view partially in vertical section and partially in elevation, of a tank gage mounted on a dash board or the like, embodying features of the invention; Fig. 2 is a view in front elevation showing the arrangement of the indicator, supporting bracket and filling spout; and Fig. 3 is a view in detail showing a modification of a side wall.

Referring to the drawing, a closed chamber 1 has a connecting pipe 2 leading therefrom in communication with a reservoir or tank, not shown. A diaphragm 3 in this chamber is connected to the upper wall 4 thereof by a collapsible annular side wall 5 which may be integrally formed with deep corrugations of thin sheet metal, (see Fig. 3) or may be bulit up as herein indicated of superposed oppositely dished disks or annular members that are connected at their alternate margins either by brazing, soldering or welding so as to form a hermetical seal.

A bracket 6 that may be readily inserted through the opening of a dash 7 or other supporting part, is connected to the upper wall 4 of the tank and is provided with a longitudinal duct 8 through its lower member that opens into the tank through an aperture in the top wall and is provided at its outer end with a closure, preferably in the form of a valve cap 9 that is screw-threaded on to a suitably formed boss or nipple 10 of the bracket. A lug 11 from the rear of the bracket forms a support for a fulcrum pin 12 on which a lever 13 is pivoted. The inner arm of the lever is adjustably connected to the diaphragm 3 by a link 14 whose sections are adjustably connected by a turn buckle 15. A suitably disposed pointer 16 on the other arm of the lever 13 sweeps a dial or scale 17 that is inserted in transverse slots of the lower arm of the bracket and an upper divergent arm 18. A glass shield 19 or other transparent plate is secured over the scale 17 and the whole is housed in a suitable casing 20, preferably of sheet metal that is formed to close over the end portions of the arms of the bracket and to be secured into position by holding screws 21 that likewise fasten the bracket on the member 7.

When arranged for use, the gage is mounted as indicated, on any desired supporting member, as for example the dashboard of an automobile, and is connected by a tube with a tank. The chamber is filled with suitable liquid through the valve 9 which is easy of access, so that on any drop in the level of the tank to be gaged, the consequent exhaustion or tendency to exhaustion of the chamber of the gage, causes the consequent expansion of the diaphragm and annular wall supporting the same. This moves the lever so that its index traverses the dial and indicates to the user the amount of fuel in the tank. It is to be understood, of course, that the tube from the gage opens into the bottom of the tank to which the gage is applied. As a result of this construction a gage is obtained that may be operated at any desired distance above the level of the tank to which it is applied, that has no intricate mechanism for translating the rise and fall of the liquid in the tank to the indicator of the gage and that is readily accessible for repair and for replacement of the operating fluid. The position of the valve on the exterior of the dash or other support where it can be readily opened to admit an additional supply of filling or operating liquid and the rigid support afforded by the bracket which also acts as the filling valve connection are features which make the gage particularly adaptable for use on vehicles.

Obviously, changes in the details of construction may be made without departing from the spirit of my invention and I do not care to limit myself to any particular form or arrangement of parts.

What I claim is:—

1. A gage for tanks comprising a tube adapted to be connected at its outlet end to the lower portion of a tank, a collapsible chamber opening at its base into the inlet end of the tube and having a wall moving in response to the variations in the support afforded thereto by the contents of the chamber against atmospheric pressure, a bracket supporting the chamber and having a duct therethrough opening into a filling opening of the chamber, a valve on the bracket for sealing the duct, and means carried by the bracket and operated by the wall for indicating the position and movement of the latter.

2. A gage for tanks comprising a tube adapted to be connected at its outlet end to the lower portion of a tank, a collapsible chamber opening into the inlet end of the tube and having a wall moving in response to variations in the support afforded thereto by the contents of the chamber against atmospheric pressure, means supporting the chamber and having an inlet duct therethrough in communication with the inlet duct of the chamber and a valve on the supporting means for controlling the duct therethrough.

3. A gage for tanks comprising a supporting bracket having a supply valve on its outer portion controlling a duct leading through the bracket to the inner portion thereof, a collapsible chamber supported on the inner portion of the bracket with an inlet thereto in communication with the bracket duct, the chamber having a wall that is movable in response to variations in the support afforded thereto by the contents of the chamber against atmospheric pressure, a tube for connecting the interior of the chamber with a tank, and means carried by the bracket and operated by the movable wall for indicating the position of the latter.

4. A gage for tanks comprising a supporting bracket having a supply valve on its outer portion controlling a duct leading through the bracket to the inner portion thereof, a collapsible chamber supported on the inner portion of the bracket with an inlet thereto in communication with the bracket duct, the chamber having a wall that is movable in response to variations in the support afforded thereto by the contents of the chamber against atmospheric pressure, a tube for connecting the interior of the chamber with a tank, a scale on the outer portion of the bracket, a view-shield on the bracket for the scale, an indicator pivoted on the bracket and adapted to traverse the scale, and an adjustable connection between the indicator and movable wall for operating the indicator by the movement of the wall.

In testimony whereof I affix my signature in presence of two witnesses.

EDMUND J. COPELAND.

Witnesses:
  ANNA M. DORR,
  C. R. STICKNEY.